P. HADNAGY.
GEARING.
APPLICATION FILED SEPT. 30, 1909.
960,900.
Patented June 7, 1910.
3 SHEETS—SHEET 1.
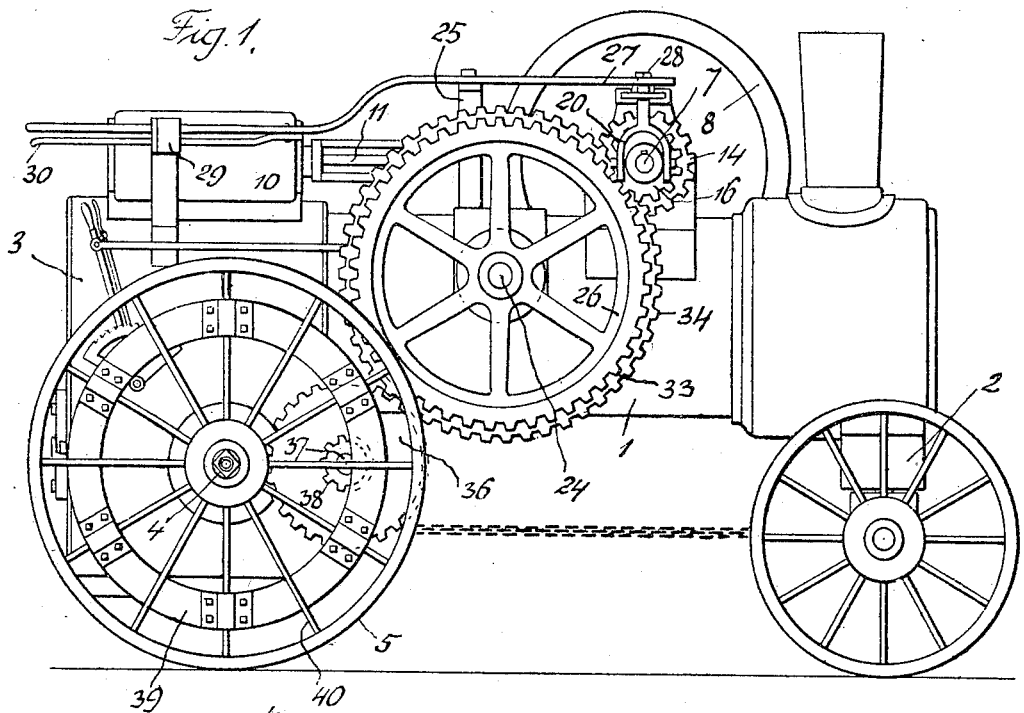
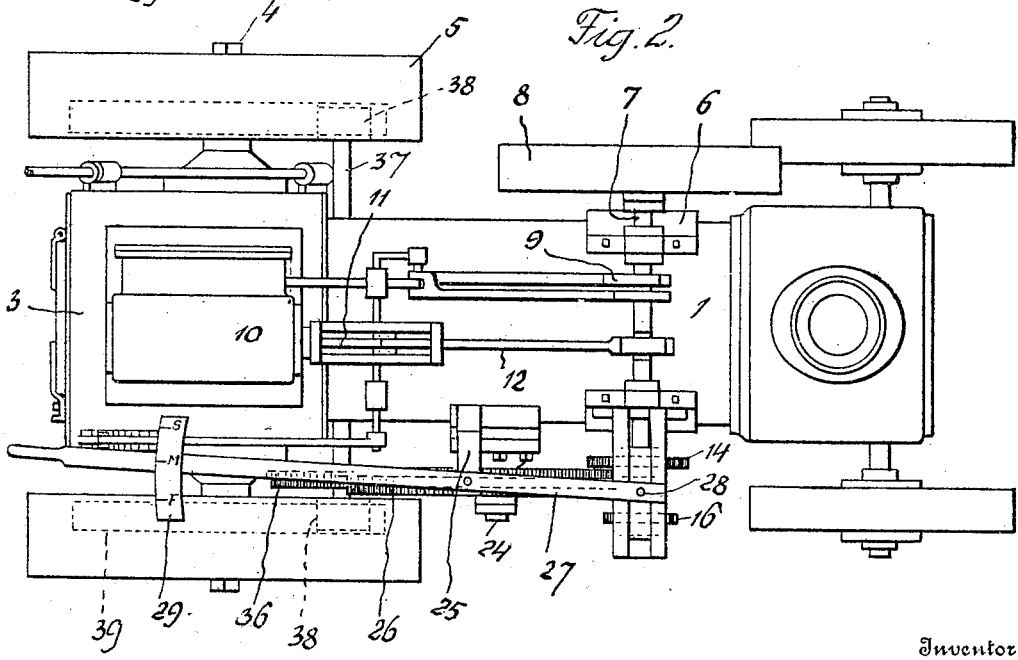
Witnesses
A. H. Rabsag
R. H. Butler
Inventor
Peter HADNAGY,
By H. C. Evert & Co.
Attorneys

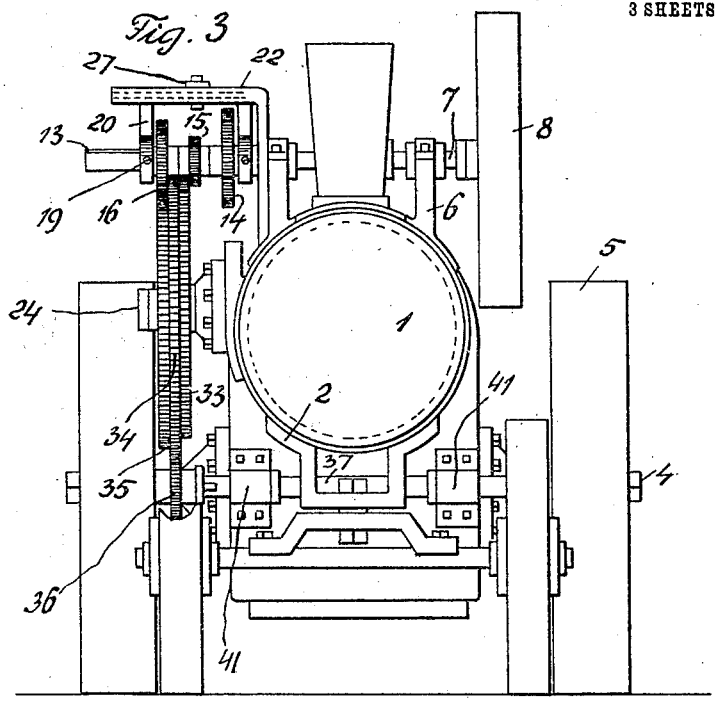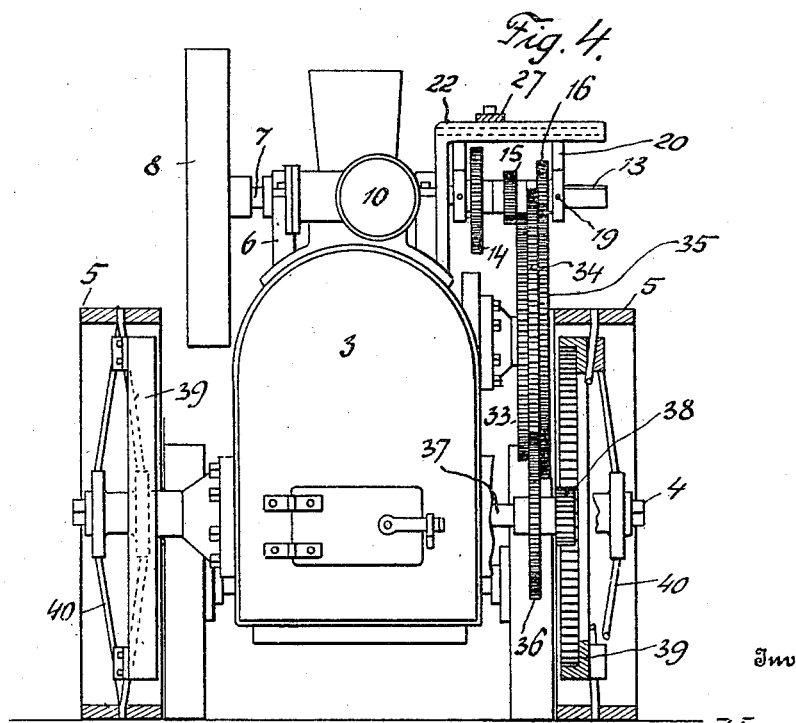

P. HADNAGY.
GEARING.
APPLICATION FILED SEPT. 30, 1909.
960,900.
Patented June 7, 1910.
3 SHEETS—SHEET 3.
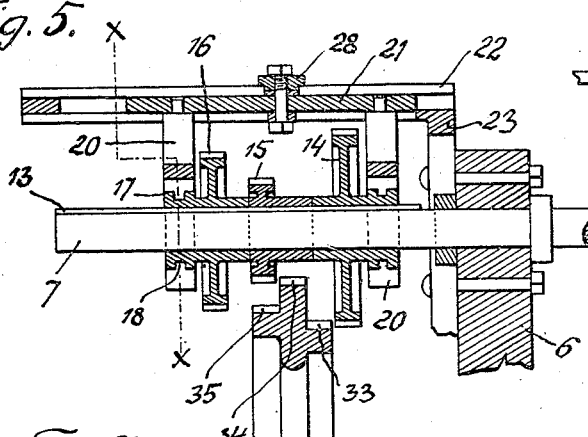
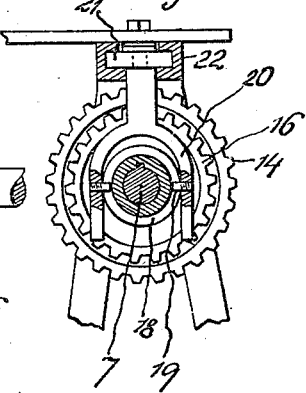
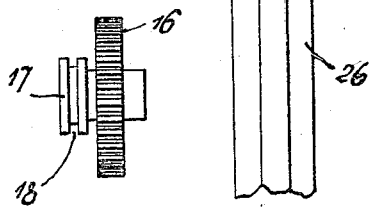
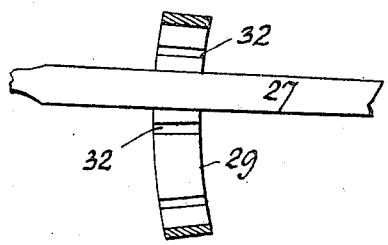
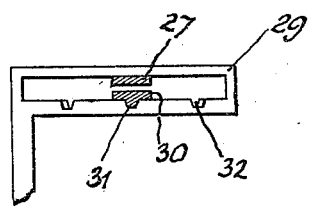
Witnesses:
A. H. Rabsag,
R. H. Butler
Inventor:
Peter HADNAGY,
By: H. C. Evert Co.
attorneys.

UNITED STATES PATENT OFFICE.

PETER HADNAGY, OF DAYTON, OHIO.

GEARING.

960,900.  Specification of Letters Patent.  Patented June 7, 1910.

Application filed September 30, 1909. Serial No. 520,278.

*To all whom it may concern:*

Be it known that I, PETER HADNAGY, a subject of the King of Hungary, residing at Dayton, in the county of Montgomery and State of Ohio, have invented certain new and useful Improvements in Gearing, of which the following is a specification, reference being had therein to the accompanying drawing.

This invention relates to a variable speed mechanism for traction engines, and the primary object of my invention is to provide in a manner as hereinafter set forth and claimed a simple and durable mechanism by which the speed at which the engine is adapted to travel is regulated.

Another object of my invention is to provide a variable speed mechanism for traction engines that will be strong and durable, positive in its action, and free from injury that might be incurred by the vibrations of the engine when in operation, particularly when traveling over rough and irregular roads.

A further object of this invention is to furnish a traction engine with transmission gears that will safely transmit a rotary movement to the driven wheels of the engine.

These and such other objects as may hereinafter appear are attained by a mechanism that will be hereinafter described in detail and then claimed.

Reference will now be had to the drawings forming a part of this specification, wherein there is illustrated a preferred embodiment of the invention; but it must be understood that the structural elements thereof can be varied or changed, as to the shape, size and manner of assemblage without departing from the spirit of the invention.

In the drawings:—Figure 1 is a side elevation of a traction engine provided with the variable speed mechanism, Fig. 2 is a plan of the same, Fig. 3 is a front elevation of the engine, Fig. 4 is a rear elevation, partly broken away and partly in section, Fig. 5 is an enlarged longitudinal sectional view of a portion of the variable speed mechanism, Fig. 6 is a vertical cross sectional view of the same taken on the line X—X of Fig. 5, Fig. 7 is a front elevation of one of the gear wheels of the mechanism, Fig. 8 is a horizontal sectional view of a lock or rack frame used in connection with the controlling lever of the mechanism, and Fig. 9 is a front elevation of the same.

As an example of the type of traction engine in connection with which my variable speed mechanism can be used, I have illustrated an engine comprising a boiler 1 having the forward end thereof supported by a truck 2, while the rear end is provided with a fire-box 3 having the sides thereof provided with stub axles 4 for supporting revoluble wheels 5. The top of the boiler 1 is provided with bearings 6 for a transverse crank shaft 7 provided with a belt wheel 8 and eccentrics 9. The top of the fire-box 3 is provided with a cylinder 10 having the piston rod 11 thereof connected by a pitman 12 to the cranked portion of the shaft 7. The eccentrics 9 actuate the slide valves of the cylinder 10, and the operation or admission of steam to the cylinder 10 is controlled through the medium of the ordinary valve mechanism forming part of the traction engine. All the above mentioned elements have been conventionally illustrated, as they form no part of my invention.

In the practice of my invention, I provide the shaft 7 with a spline or rib 13 and slidably mounted upon said shaft and adapted to rotate therewith are gear wheels 14, 15 and 16, these gear wheels being of three different sizes. The hubs of the gear wheels 14, 15 and 16 are provided with extensions having collars 17 providing circumferentially arranged grooves 18 and adapted to engage in said grooves are the inwardly projecting diametrically opposed pins 19 of stirrups 20, these stirrups being suitably secured to a slide bar 21 slidably mounted in parallel channel shaped guides 22, carried by a bracket 23 suitably secured to the outer side of one of the bearings 6.

The boiler 1 is provided with a stub shaft 24 and a bracket 25, the former revolubly supporting a large gear wheel 26, while a horizontal controlling lever 27 is fulcrumed upon the bracket 25. The forward end of the controlling lever 27 is pivotally connected, as at 28 to the slide bar 21, while the rear end thereof extends through a lock or rack frame 29 carried by the fire-box 3. The rear end of the controlling lever 27 is provided with a resilient locking member 30 having a depending rib or lug 31 adapted to engage in notches 32 provided therefor in the rack frame 29. The top of the frame 29 is graduated to indicate the speed of the engine according to the position of the controlling lever.

The gear wheel 26 is provided with three sets of circumferentially arranged teeth 33, 34 and 35, the teeth 34 meshing with the teeth of a gear wheel 36 mounted upon a transverse shaft 37 revolubly supported beneath the boiler 1 in bearings 41 carried by the forward end of the fire-box 3. Mounted upon the shaft 37 are pinions 38 adapted to mesh with circular racks 39 secured to the spokes 40 of the wheels 5. A suitable steering mechanism can be used for guiding the forward truck 2 of the engine.

By shifting the controlling lever 27, either one of the gear wheels 14, 15 or 16 can be moved into engagement with the gear wheel 26, but as shown in Fig. 5 of the drawings, said gear wheels are positioned to freely revolve without moving the gear wheel 26 or the engine. When the gear wheel 14 meshes with the teeth 33 of the wheel 26, the engine is adapted to travel at its greatest speed; the gear wheel 16 with the teeth 35, the lowest speed; while the gear wheel 15 meshing with the teeth 34 represents the medium speed of the engine.

From the foregoing it will be observed that I am enabled to transmit three different speeds from a driven shaft to another shaft, with the minimum number of gear wheels and with the maximum amount of power transmitted.

Having now described my invention, what I claim as new is:—

1. A variable speed mechanism for traction engines comprising the combination with a driven shaft, and supporting means for one end of said shaft of gear wheels of different diameters slidably mounted upon and rotating with said shaft, and each having its hub formed with an extension, the extension of each outer gear being grooved, a bracket extending over said gear wheels, a bar slidably-mounted in that portion of the bracket which extends over the gear wheels, a rotatable transmission member arranged in operative relation with respect to said gear wheels and having three toothed portions each of a different diameter with respect to the other, said member being independent of said shaft, a hanger depending from said bracket for supporting the other end of said shaft, yokes depending from the slide bar and straddling said grooved extensions, inwardly extending pins carried by said yokes and engaging in the grooves of the extensions for shifting the gear wheels when the slide bar is moved whereby the transmission member is operatively connected by one of said gear wheels to the driven shaft, a support, and a controlling lever pivoted intermediate its ends to said support and having one end extending over said bracket and connected to said slide bar for shifting the latter when the lever is moved on its pivot.

2. A variable speed mechanism for traction engines comprising the combination with a driven shaft, and supporting means for one end of said shaft, of gear wheels of different diameters slidably mounted upon and rotating with said shaft, and each having its hub formed with an extension, the extension of each outer gear being grooved, a bracket extending over said gear wheels, a bar slidably mounted in that portion of the bracket which extends over the gear wheels, a rotatable transmission member arranged in operative relation with respect to said gear wheels and having three toothed portions each of a different diameter with respect to the other, said member being independent of said shaft, a hanger depending from said bracket for supporting the other end of said shaft yokes depending from the slide bar and straddling said grooved extensions, inwardly extending pins carried by said yokes and engaging in the grooves of the extensions for shifting the gear wheels when the slide bar is moved whereby the transmission member is operatively connected by one of said gear wheels to the driven shaft, a support, a controlling lever pivoted intermediate its ends to said support and having one end extending over said bracket and connected to said slide bar for shifting the latter when the lever is moved on its pivot, and means engaging with the other end of said lever for locking it in its adjusted position.

In testimony whereof I affix my signature in the presence of two witnesses.

PETER HADNAGY.

Witnesses:
   Jahn Bingir,
   Fulo Lojos.